United States Patent [19]

Odate et al.

[11] Patent Number: 4,776,032
[45] Date of Patent: Oct. 4, 1988

[54] REPEATER FOR A SAME FREQUENCY WITH SPILLOVER MEASUREMENT

[75] Inventors: Hitoshi Odate, Kanagawa; Hisao Takahashi, Tokyo; Toshio Suzuki, Kanagawa; Toshio Nojima, Kanagawa; Sadayuki Nishiki, Kanagawa; Teruya Fujii, Kanagawa, all of Japan

[73] Assignee: Nippon Telegraph and Telephone Corporation, Tokyo, Japan

[21] Appl. No.: 940,134

[22] Filed: Dec. 10, 1986

[30] Foreign Application Priority Data

May 15, 1985 [JP] Japan ................................ 61-111088
Dec. 16, 1985 [JP] Japan ................................ 60-281219
Sep. 24, 1986 [JP] Japan ................................ 61-223496

[51] Int. Cl.$^4$ .......................... H04B 7/15; H04B 7/02
[52] U.S. Cl. .......................... 455/24; 455/10; 455/52
[58] Field of Search .................. 455/7, 10, 11, 20, 22, 455/24, 52, 78; 370/32

[56] References Cited

U.S. PATENT DOCUMENTS

| | | | |
|---|---|---|---|
| 3,448,383 | 6/1969 | Starzec et al. | 455/24 |
| 3,696,429 | 10/1972 | Tressa | 455/24 |
| 4,317,217 | 2/1982 | Davidson | 455/22 |
| 4,383,331 | 5/1983 | Davidson | 455/24 |
| 4,475,243 | 10/1984 | Batlivala et al. | |
| 4,475,246 | 10/1984 | Batlivala et al. | 455/22 |
| 4,493,111 | 1/1985 | Ganem | 455/24 |
| 4,725,842 | 2/1988 | Mayberry | 455/24 |

FOREIGN PATENT DOCUMENTS

| | | | |
|---|---|---|---|
| 0133148 | 10/1980 | Japan | 455/24 |
| 2065421 | 6/1981 | United Kingdom | 455/24 |

OTHER PUBLICATIONS

Anaren, Microwave Components Catalog.
*Cell Enhancer: Beyond the Outer Limits, Cellular Business,* Rosenbloom et al, Kuly, 1986, pp. 40 and 42.
The Cell Enhancer, IEEE, Quinn, 1986, pp. 77-83.

*Primary Examiner*—Robert L. Griffin
*Assistant Examiner*—Curtis Kuntz
*Attorney, Agent, or Firm*—Armstrong, Nikaido, Marmelstein & Kubovcik

[57] ABSTRACT

The system for measuring the spillover signal from a transmitter to a receiver in a same frequency repeater or a booster has a frequency conversion device which slightly offsets the transmission frequency from the reception frequency, and a signal detector which measures the offset frequency component in the reception signal. The offset frequency is around 100 Hz, which is higher than the fading frequency, and low enough not to affect the operation of receivers. The measured spillover level is used to control the gain of the repeater, and/or to cancel the spillover signal, so that the repeater has the maximum gain without suffering from oscillation.

10 Claims, 7 Drawing Sheets

Fig. 13

REPEATER FOR A SAME FREQUENCY WITH SPILLOVER MEASUREMENT

BACKGROUND OF THE INVENTION

The present invention relates to a wireless repeater system which amplifies a receive signal and transmits the amplified signal using the same transmit frequency as the receive frequency.

Figure 1:
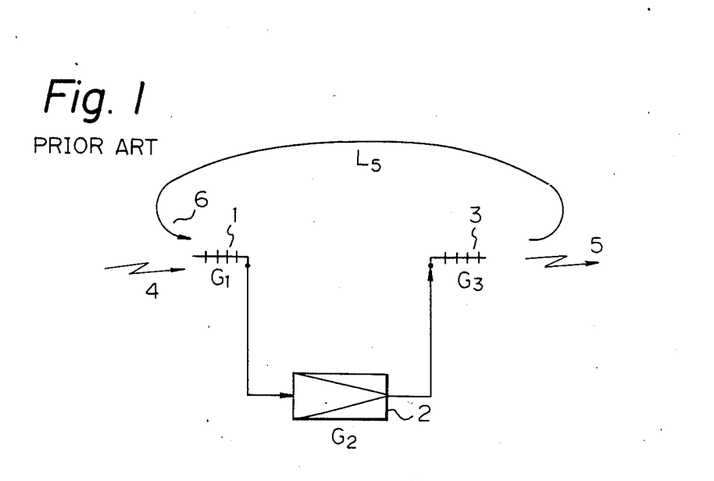
FIG. 1 is a block diagram of a prior booster.

FIG. 1 shows general concept of a prior repeater system in which the transmit frequency is the same as the received frequency. In the figure, the repeater has a receiver antenna 1 with the gain $G_1$, the amplifier 2 with the gain $G_2$, and the transmitter antenna 3 with the gain $G_3$. The received signal 4 is amplified by the amplifier 2, which provides the transmitted signal 5. The frequency of the received signal 4 is the same as that of the transmitted signal 5, and the total gain in the repeater is $G_1 \times G_2 \times G_3$. The numeral 6 shows the spillover signal of the transmitted signal at the receiver antenna 1. When the transmission loss between the transmitter antenna and the receiver antenna is $L_5$, the level of the signal 6 is $1/L_5$ as high as the signal 5.

When the transmission loss $L_5$ between the antennas is less than the total gain of the repeater ($L_5 < G_1 \times G_2 \times G_3$), the system is unstable, and will oscillate and disturb communication. Therefore, the directivity of the antennas and the amplifier of the repeater are designed so that the transmission loss $L_5$ between the antennas is considerably larger than the total repeater gain.

Figure 2:
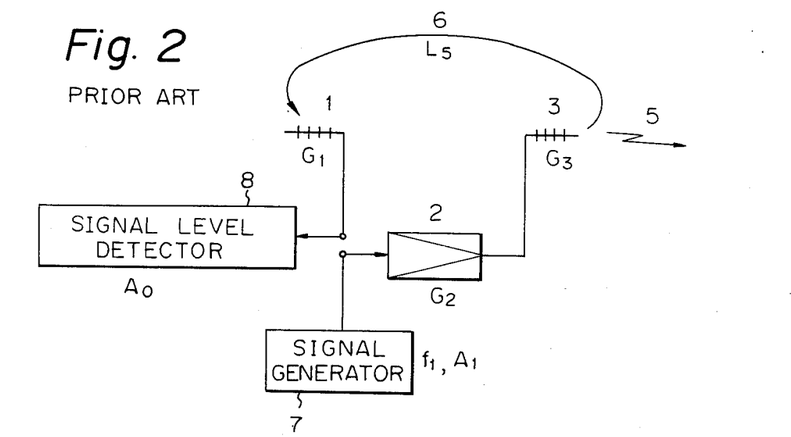
FIG. 2 is a block diagram of the prior apparatus for measuring the transmission loss between a transmitter antenna and a receiver antenna.

FIG. 2 show a block diagram of a prior repeater which measures the transmission loss between the antennas. In the figure, the test signal with the level $A_1$ and the frequency $f_1$ from the signal generator 7 is applied to the amplifier 2 which has the gain $G_2$, so that the signal with the frequency $f_1$ is transmitted in the air through the antenna 3 which has the gain $G_3$. The signal level detector 8 measures the spillover signal 6 through the receiver antenna 1 which has the gain $G_1$. When the measured value is $A_0$, the transmission loss $L_5$ is;

$L_5 = (A_1/A_0) \times G_1 \times G_2 \times G_3$

Therefore, the value $G_2$ is designed so that $L_5 > G_1 \times G_2 \times G_3$ is satisfied.

However, one disadvantage is that this measurement is not real-time. Therefore, even when the transmission loss is large when the system is installed or designed, the transmission loss will be decreased by any change in the surroundings of the system. For instance, when a reflection body for an electric wave is built close to the antennas, the transmission loss between the antennas would be decreased as compared with that of the initial value.

Another prior art for measuring transmission loss is shown in the Japanese patent laid open publication No. 29921/74, in which the transmit signal is AM modulated by a pilot signal, which is detected by the receiver side. In this case, the desired received signal and the undesired interference signal (spillover signal) are combined. Since the phase of the interference signal does not coincide with the desired received signal, the detected level by an envelope detector has frequency characteristics. Therefore, the accurate measurement of the spillover signal is impossible using a simple method as an envelope detector method.

Still another prior art for measuring transmission loss of a spillover signal is shown in the Japanese patent laid open publication No. 95435/83, in which a pilot signal is transmitted, and the received level of that pilot signal is measured. However, the disadvantages are that (a) must have an additional band for transmitting a pilot signal, and (b) only the transmission loss at the pilot frequency is measured, but the transmission loss at other frequencies can not be measured.

Still another prior art for measuring transmission loss of a spillover signal is shown in U.S. Pat. No. 4,475,243, in which a time delay of a spillover signal is measured and the correlation between a transmit signal and a received signal is measured in order to compensate the spillover signal. However, one disadvantage is that accurate measurement is impossible when the time delay is small as is the case of a booster for a mobile communication.

Still another prior art for measuring transmission loss of a spillover signal is shown in the Japanese patent laid open publication No. 66025/79, in which the output power of the transmitter is measured. When the system oscillates, the transmission power increases, thus, the oscillation of the system is detected by measuring the transmission power in order to stop working or reduce its amplification. However, this technique has the disadvantage that the abnormal condition is detected only by the oscillation, and the system does not recover even after the possibility of oscillation disappears.

SUMMARY OF THE INVENTION

It is an object of the present invention to overcome the disadvantages and limitations of a prior wireless repeater system by providing a new and improved wireless repeater system.

Another object of the invention is to provide a wireless repeater system or a booster in which transmission loss between a transmitter antenna and a receiver antenna is measured when the system is in service.

Still another object of the present invention is to provide a wireless repeater system or a booster in which the maximum repeater gain is obtained with no oscillation.

Still another object of the present invention is to provide a wireless repeater system or a booster in which a spillover signal from a transmitter antenna to a receiver antenna is cancelled, depending upon the change of environment.

The above and other objects are attained by a repeater comprising a reception antenna for receiving radio signal, an amplifier for amplifying the signal thus received, and a transmission antenna for transmitting amplified signal in the same frequency as reception frequency wherein a frequency offset means is provided so that transmission frequency is slightly offset from reception frequency, and a signal detector, which measures if the received signal has an offset component level which shows the spillover level from the transmission antenna to the reception antenna.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 3:
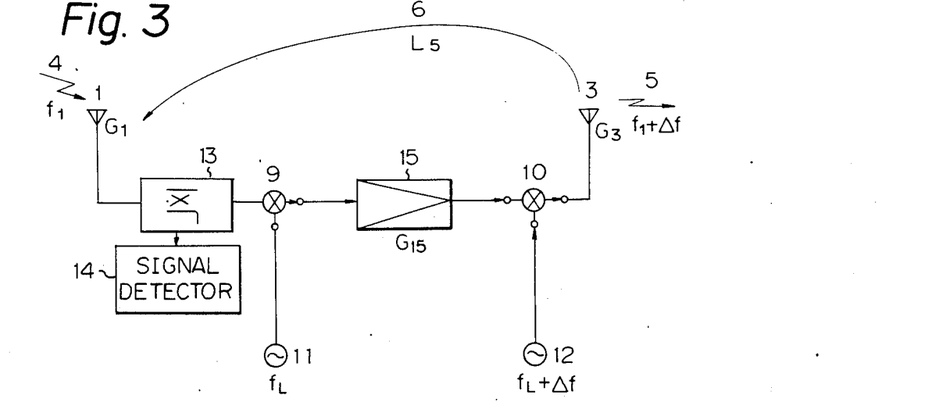
FIG. 3 is a block diagram of the wireless repeater system according to the present invention.

FIG. 3 is a block diagram of the first embodiment of the wireless repeater system or the booster according to the present invention. In the figure, the numeral 1 is a receiver antenna, 3 is a transmitter antenna, 4 is a received signal, 5 is a transmitted signal, 6 is a spillover signal from a transmitter antenna to a receiver antenna, 9 is a first mixer, 10 is a second mixer, 11 is a first local oscillator, 12 is a second local oscillator, 13 is a sampling means such as a directional coupler, 14 is a signal detector and 15 is an amplifier.

In operation, the received signal in service with frequency $f_1$ and level $A_1$ is received by the receiver antenna 1 which outputs the signal with level $G_1 A_1$ where $G_1$ is the gain of the receiver antenna 1. The received signal is frequency-converted by the first mixer 9 so that the output frequency of the mixer 9 is $f_{IF}$, then, the intermediate frequency $f_{IF}$ is amplified by the amplifier 15 which has the gain $G_{15}$. The output of the amplifier 15 is applied to the second mixer 10 so that the intermediate frequency $f_{IF}$ is converted to the radio frequency $f_1$ with a small frequency shift $\Delta f$. Therefore, the transmitted frequency from the transmitter antenna is $f_1 + \Delta f$. That frequency difference $\Delta f$ between the receive frequency $f_1$ and the transmit frequency $f_1 + \Delta f$ is achieved by shifting the frequency of the second local oscillator 12 from that of the first local oscillator 11 so that the frequency of the first local oscillator 11 is $f_L$, and the frequency of the second local oscillator 12 is $f_L + \Delta f$, where $f_L$ is $f_1 - f_{IF}$.

The level $A_2$ of the transmitted signal from the transmitter antenna 3 is;

$$A_2 = A_1 \times G_1 \times G_{15} \times G_3 \times G_4 \times G_5$$

where $G_4$ is the gain of the mixer 9, and $G_5$ is the gain of the second mixer 10. $G_{all}$ is the total gain of the repeater, that is;

$$G_{all} = G_1 \times G_{15} \times G_3 \times G_4 \times G_4 \times G_5$$

A part of the transmitted signal leaks to the receiver antenna 1 as a spillover signal with the transmission loss $L_5$ between the transmitter antenna 3 and the receiver antenna 1. A part of the received signal is sampled by the directional coupler 13 which is located upstream of the first mixer 9, and the sampled signal is applied to the signal detector 14.

Figure 4:
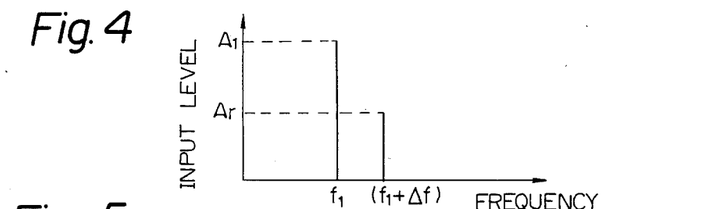
FIG. 4 shows the spectrum of the signal applied to the signal detector 14 in FIG. 3, where $f_1$ is the receiver frequency and $f_1 + \Delta f$ is the offset received frequency.

The signal applied to the signal detector 14 is the combination of the service signal with the frequency $f_1$, and the spillover signal with the frequency $f_1 + \Delta f$ and the amplitude $A_r = A_2/L_5$. The spectra of those two signals are shown in FIG. 4. When it is assumed that the received signal 4 in service is $e_i(A_1 \cos 2\pi f_1 t)$, and the spillover signal 6 is $e_r(A_r \cos(2\pi f_1 t + 2\pi f_t))$, then, the input signal to the signal detector 14 is $e_i + e_r$. The signal detector 14 is simply implemented by using, for instance, an envelope detector. The output of the envelope detector of that signal is;

$$(A_1^2 + 2A_1 A_r \cos 2\pi \Delta f t + A_r^2)^{\frac{1}{2}}$$

Since $A_1 >> A_r$ is satisfied, that the envelope of input signal is;

$$A_1 + A_r \cos 2\pi \Delta f t$$

Thus, the envelope of input signal shows a beat with frequency $\Delta f$. The ratio of DC and AC elements of the envelope is;

$$A_r/A_1 = A_2/(L_5 \times A_1) = G_{all}/L_5$$

Therefore, the loop gain of spillover signal is directly obtained by measuring the beat of the input signal envelope.

The offset frequency $\Delta f$ is selected so that it is higher than the fading frequency which is about 40 Hz (a case of 900 MHz radio frequency band and about 50 km/h mobile speed) depending upon the speed of a mobile which carries a telephone, and lower than the margin of a receiver. Still preferably, the offset frequency is lower than the 1/10 of the channel period. In a practical design, the offset frequency $\Delta f$ is selected around 50 Hz–200 Hz.

The above embodiment has the advantage that no particular measuring apparatus is necessary except for a booster itself, and the transmission loss is measured when the system is in service.

Figure 5:
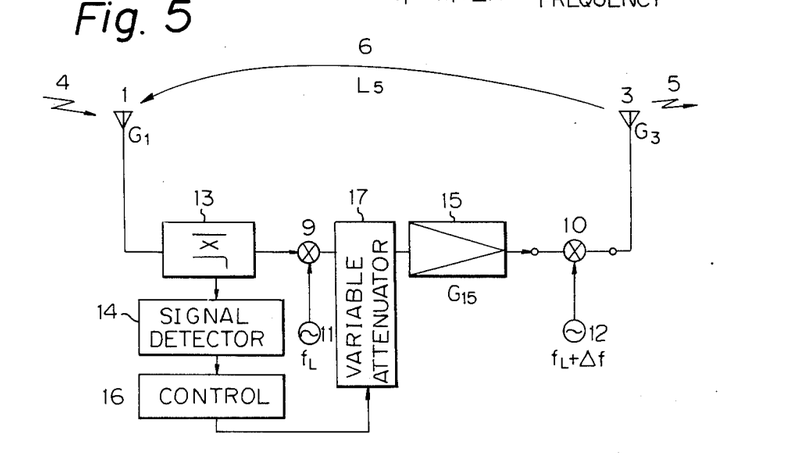
FIG. 5 is another embodiment of the wireless repeater system according to the present invention.

FIG. 5 shows the second embodiment of the present invention. In the figure, the numerals 1 through 15 are the same as those in FIG. 3, 16 is a control, and 17 is a variable attenuator. The control 16 controls the variable attenuator 17 according to the transmission attenuation $L_5$ which is provided by the signal detector 14 so that the input level of the amplifier 15 is adjusted. The adjustment of the variable attenuator 17 is equivalent to the adjustment of the gain of the amplifier 15. When the transmission loss $L_5$ between the antennas is large, the attenuation in the variable attenuator 17 is adjusted to be small so that the gain of the repeater is large. On the other hand, when the transmission loss $L_5$ is small, the gain of the repeater is adjusted to be small so that the system does not oscillate.

Therefore, the gain of the repeater may be the maximum within the range that the system does not oscillate.

In a prior art, the gain of a repeater is smaller than that of the present invention, because the gain of the prior art is fixed to the value that the system is in the worst condition. So, even when the transmission loss is large in a prior art, the gain is not adaptively increased in a prior art.

Figure 6:
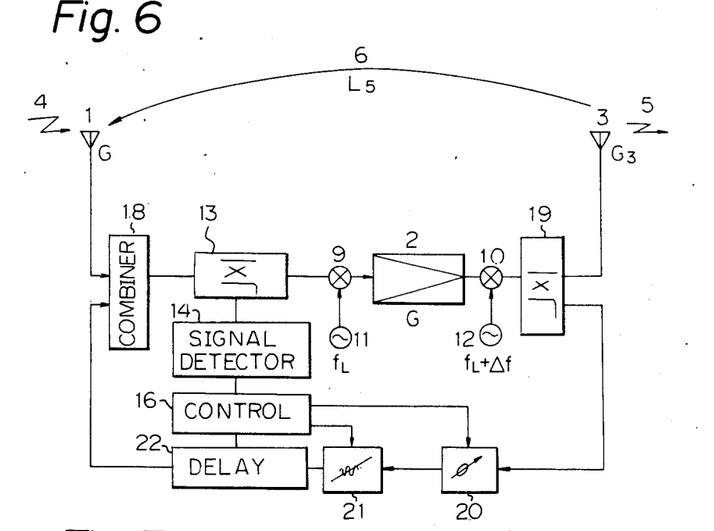
FIG. 6 is still another embodiment of the wireless repeater system according to the present invention.

FIG. 6 shows the third embodiment of the present invention. In the figure, the numerals 1 through 15 are the same as those in FIG. 3, and the numeral 16 is a control, 18 is a combiner, 19 is a sampling means such as a directional coupler, 20 is a variable phase shifter, 21 is a variable gain attenuator, and 22 is a delay circuit. In the figure, the output of the second mixer 10 is divided by the directional coupler 19. One output of the directional coupler 19 is transmitted in the air through the transmission antenna 3, and the other output of the directional coupler 19 is applied through the variable phase shifter 20, the variable attenuator 21 and the delay circuit 22 to the combiner 18, which also receives the spillover signal 6, together with the reception service signal. The control 16 controls the variable phase shifter 20, the variable attenuator 21 and the delay circuit 22 so that the output signal of the delay circuit 22 has the same level, the opposite phase and the same arrival time as those of the spillover signal 6, according to the measured result of the spillover signal by the detector 14. Then, the spillover signal is cancelled in the combiner 18.

The embodiment of FIG. 6 has the advantage that the gain of the booster is not restricted by a spillover signal.

Figure 7:
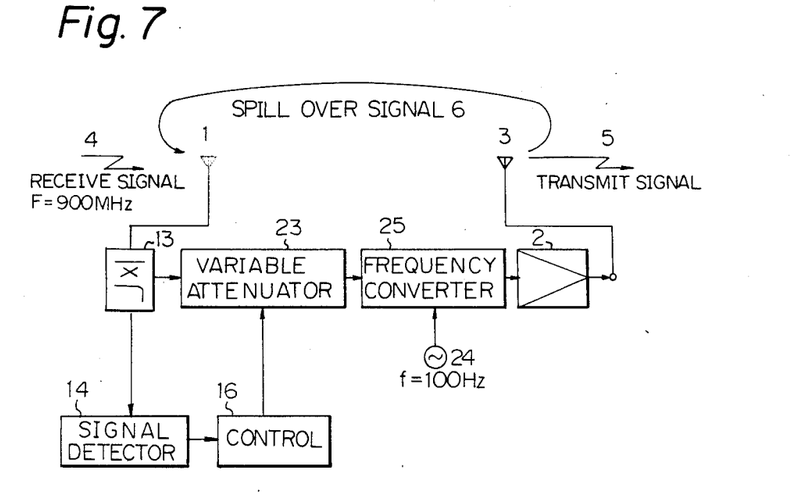
FIG. 7 is still another embodiment of the wireless repeater system according to the present invention.

FIG. 7 is the modification of the embodiment of FIG. 5. The feature of the FIG. 7 is that the repeater operates in the radio frequency, while the embodiment of FIG. 5 converts the receive radio frequency to intermediate frequency (IF), which is amplified, then, re-converted to the radio frequency.

In FIG. 7, the amplifier 2 operates in the radio frequency, therefore, no mixers (9 and 10 in FIG. 5), nor local oscillators (11 and 12 in FIG. 5) are provided in FIG. 7. Instead, the local oscillator 24 in FIG. 7 provides the offset frequency $\Delta f$, which is applied to the frequency converter 25 which shifts the radio frequency by $\Delta f$.

The frequency converter 25 and the local oscillator 24 in FIG. 7 are provided at the input of the amplifier 2. The frequency converter 25 and the local oscillator 24 may be provided at the output of the amplifier 2. The location of those members does not effect to the operation of the repeater, since the whole system operates linearly to an input signal.

Figure 8:
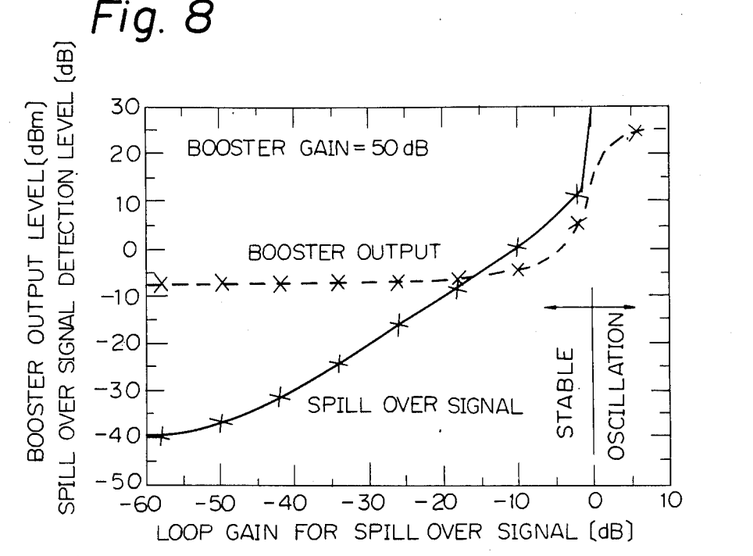
FIG. 8 shows the experimental curves of the present invention.

FIG. 8 shows the experimental curves of the present invention. In the figure, the horizontal axis shows the loop gain for spillover signal. When that loop gain exceeds 0 dB, the system oscillates, therefore, that loop gain must be lower than 0 dB. The vertical axis shows the spillover signal detection level, and the booster output level. The booster output is almost constant when the loop gain is less than $-10$ dB, and it increases suddenly and oscillates when the loop gain is close to 0 dB. It is shown that the spillover is accurately detected in the region where loop gain is $-50$ dB to 0 dB. In the experiment of FIG. 8, the booster gain is fixed to 50 dB.

Figure 9:
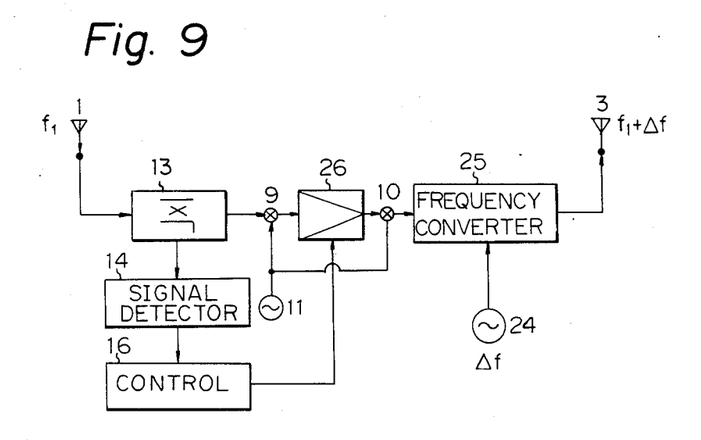
FIG. 9 is a block diagram of still another embodiment of the wireless repeater system according to the present invention.

FIG. 9 shows another embodiment of the present invention, and the feature of FIG. 9 is the use of a frequency converter made of an infinite phase shifter. The embodiment of FIG. 9 has the advantage that the required accuracy of the local oscillator 11 is not as stringent when compared with the previous embodiments.

In FIG. 9, the numerals 1 through 25 are the same as those in FIG. 5, except that the amplifier 26 functions as a variable gain amplifier. The numeral 10 is a second mixer, which takes the local oscillator 11, which is common both to the first mixer 9 and the second mixer 10. It should be appreciated of course that the mixers 9 and 10 together with the local oscillator 11 may be omitted if the amplifier 26 operates in the radio frequency as is the case of the embodiment of FIG. 7.

The receive frequency $f_1$ is converted to the intermediate frequency (IF) by the first mixer 9, and then, amplified by the variable gain amplifier 26, then, the output of the amplifier 26 is re-converted to the radio frequency $f_1$ by the second mixer 10. The frequency of the output of the second mixer 10 is shifted by the frequency converter 25 by $\Delta f$, which is transmitted through the transmission antenna 3. The operation of the directional coupler 13, the signal detector 14 and the control 16 for measuring the spillover signal and controlling the gain of the amplifier is the same as the previous embodiments.

Figure 10:
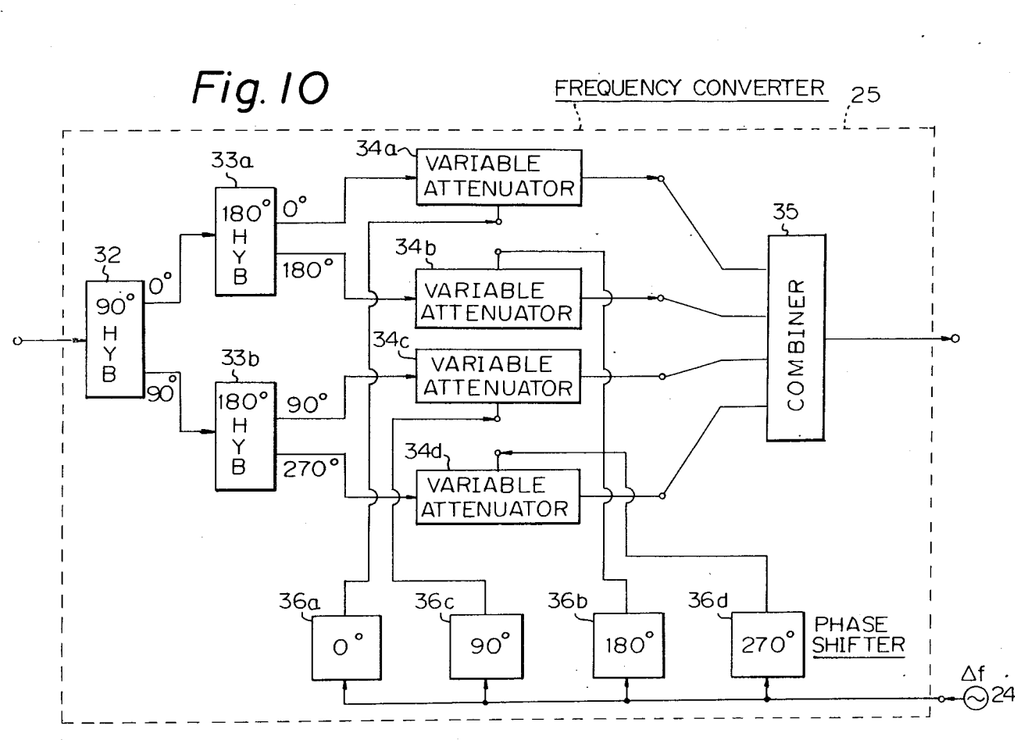
FIG. 10 is a block diagram of the phase modulator 26 in FIG. 9.

FIG. 10 shows a block diagram of the frequency converter 25 or the infinite phase shifter. In the figure, the numeral 32 is a 90° hybrid circuit which divides an input signal to a pair of signals having the same amplitude and 90° phase difference with each other. The numerals 33a and 33b are 180° hybrid circuits each of which divides an input signal to a pair of outputs having the equal amplitude and 180° phase difference with each other. The numerals 34a, 34b, 34c and 34d are variable attenuators which are adjusted by a control signal. The input levels of the variable attenuators 34a through 34d are equal with one another, and the phase of each input signal to those variable attenuators is shifted by 90° with one another by the hybrid circuits 32, 33a and 33b, so that the input of the first attenuator 34a is 0°, the phase of the second attenuator 34b is 180°, the phase of the third attenuator 34c is 90°, and the phase of the fourth attenuator 34d is 270°. The numeral 35 is a combiner for combining the outputs of the attenuators. The numerals 36a, 36b, 36c and 36d are phase shifters each of which shifts (leads) the low frequency signal of the oscillator 24 by 0°, 180°, 90°, and 270°, respectively. The outputs of the phase shifters 36a through 36d control the variable attenuators 34a through 34d, respectively.

Figure 11:
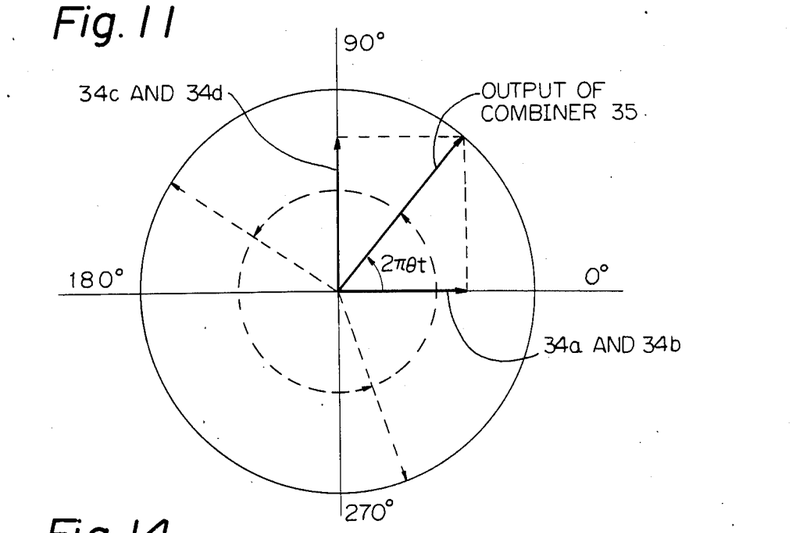
FIG. 11 is a vector diagram which shows the operation of the phase modulator in FIG. 10.

FIG. 11 shows the operation of the frequency converter of FIG. 10.

The output vectors of the attenuators 34a and 34b are located on the line 0°–180° with opposite phase with each other, and the composite vector of the two vectors vibration as simple harmonic motion. Similarly, the vectors of the attenuators 34c and 34d are located on the line 90°–270° with opposite phases from each other, and the composite vector of the two vectors vibrate in a simple harmonic motion. Therefore, the vectors of the attenuators 34a and 34b, has the phase difference by 90° as compared with that of the attenuators 34c and 34d. And, the combination of the vectors of the four attenuators in the combiner 35 provides a vector which rotates on a unit circle by 360° for each cycle of the output signal $\Delta f$ of the low frequency oscillator 24.

Thus, the transmission frequency $f_1 + \Delta f$ is obtained at the output of the frequency converter 25 in FIG. 9 by using the offset low frequency $\Delta f$, and the radio frequency is directly shifted by $\Delta f$.

Figure 12:
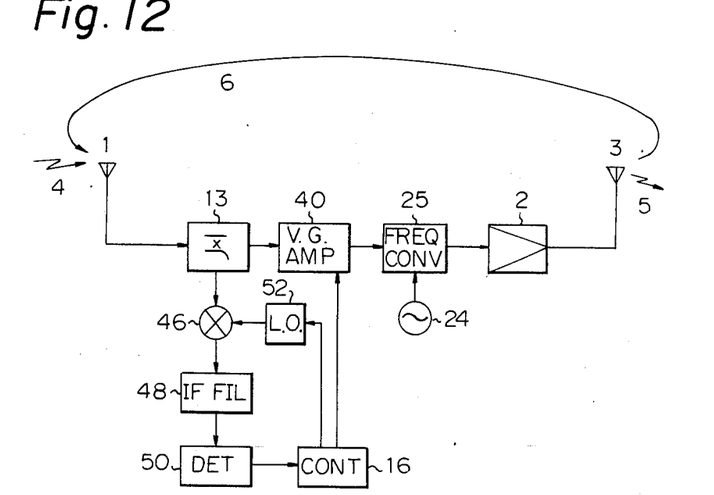
FIG. 12 is a block diagram of still another embodiment of the wireless repeater system according to the present invention.
Figure 13:
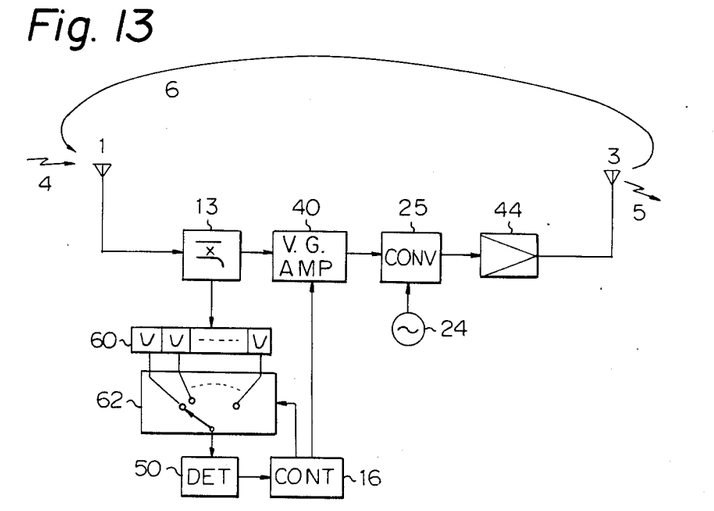
FIG. 13 is a block diagram of still another embodiment of the wireless repeater system according to the present invention.

FIGS. 12 and 13 show still another embodiment of the present invention, and the feature of the embodiment is that a plurality of radio channels are amplified by a single common amplifier, and that the gain of the amplifier is controlled for each channel. This embodiment is advantageous when the transmission loss or the spillover signal has the frequency characteristics. FIG. 12 is the embodiment that the amplification for each channel is accomplished in the intermediate frequency stage, and FIG. 13 is the embodiment that the amplification for each channel is accomplished in the radio frequency stage.

In FIG. 12, the numeral 1 is a receiver antenna, 3 is a transmitter antenna, 4 is a received signal, 5 is a transmitted signal, 6 is a spillover signal, 13 is a directional coupler, 40 is a variable gain amplifier or a variable attenuator, 25 is a frequency converter, 2 is a fixed gain amplifier, 46 is a mixer, 48 is a bandpass filter for deriving IF signal for each channel, 50 is a signal detector which is similar to that of FIG. 5, 16 is a control, 24 is an offset frequency oscillator.

The control 16 switches the local frequency of the local oscillator 52 so that desired frequency band is obtained at the output of the mixer 46, the output of which is applied to the detector 50 through the bandpass filter 48. The detector 50 detects the spillover signal by detecting the offset frequency component (Δf) as is the case of the previous embodiments, and the result of the detection for each band is applied to the control 16. Then, the control 16 sends the control signal to the variable gain amplifier 40 so that the gain for the current measured band is adjusted according to the current spillover signal level. Thus, the gain of the repeater is adjusted so that it is optimum for each band. In this embodiment, the loop gain of the spillover signal is uniform for all the bands, and all the bands can have the maximum gain keeping the predetermined margin for oscillation.

As the embodiment of FIG. 12 has a variable gain amplifier 40, the total gain by the variable gain amplifier 40 and the fixed gain amplifier 2 is variable.

It should be noted that the sequence of the location of the variable gain amplifier 40, the frequency converter 25 and the amplifier 2 is arbitrary. Of course, the amplifier 2 may be located at the input of the frequency converter 25, although the embodiment locates the same at the output of the frequency converter 25.

FIG. 13 is the modification of FIG. 12, and the feature of FIG. 13 is that the detection of the spillover signal by the detector 50 is accomplished in the radio frequency, while FIG. 12 detects the same in the IF frequency band.

In FIG. 13, the numeral 60 is a plurality of bandpass filters, and 62 is a switch for selecting one of the outputs of the bandpass filters 60. The control 16 controls the switch 62 so that the reception frequency bands are scanned, and controls the gain (or attenuation) of the gain control 40 for the selected band.

Figure 14:
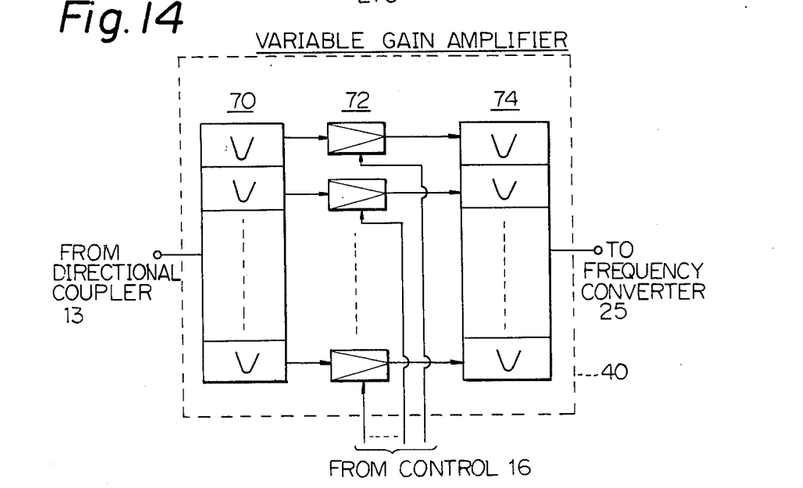
FIG. 14 is a block diagram of the gain control in FIG. 13.

FIG. 14 is a block diagram of the gain control which is used as the variable gain amplifier 40 (or a variable attenuator) in FIG. 12 and 13. In FIG. 14, the numeral 70 is a plurality of bandpass filters coupled with the directional coupler 13, 72 is a plurality of attenuators which are controlled by the control 16, and the numeral 74 is a plurality of bandpass filters coupled with the frequency converter 10. The bandpass filters 70 divide the frequency band of the input signal to a plurality of narrow bands. Each bandwidth of the output of the filter 70 is designed so that the frequency characteristics of the spillover signal is flat in that band, and that band corresponds to the band of the filter 60 in FIG. 13. The variable gain amplifier 72 are provided for each band relating outputs of the filter 70, and are controlled by the control 16 so that the gain of the repeater in each band is the optimum depending upon the spillover level of each band. The filter 74 has the similar configuration to that of the filter 70, and combines the outputs of the variable gain amplifier 72 so that the combined signal is coupled with the frequency converter 25. Thus, by using the gain control of FIG. 14, the gain of the repeater is controlled for each frequency band.

From the foregoing it will now be apparent that a new and improved radio repeater system has been found. It should be understood of course that the embodiments disclosed are merely illustrative and are not intended to limit the scope of the invention. Reference should be made to the appendant claims, therefore, rather than the specification as indicating the scope of the invention.

What is claimed is:

1. A repeater comprising:
   a reception antenna for receiving reception radio signals;
   an amplifier for amplifying the reception signals thus received at said reception antenna;
   a transmission antenna connected to said amplifier, said transmission antenna transmits amplified signals having a same frequency as the reception frequency;
   a frequency offset means connected to said amplifier and said transmission antenna, the frequency offset means slightly offsets the transmission frequency from the reception frequency; and
   a signal detector connected to said amplifier and said reception antenna, the signal detector measures an offset component level in the reception signals which shows a spillover level which is an indication of the transmission loss between the transmission antenna and the reception antenna.

2. A repeater according to claim 1, further comprising a gain control means for controlling gain of the repeater according to the measured offset component level, said gain control means being connected to said signal detector.

3. A repeater according to claim 1, further comprising
   a variable phase shifter, a variable attenuator connected to said variable phase shifter and a delay circuit connected to said variable attenuator, said shifter, said attenuator and said delay circuit are adjusted by the measured offset component level,
   a signal separator connected to said frequency offset means and said transmission antenna, said signal separator divides a part of a transmission signal, to said variable phase shifter and said variable attenuator and said delay circuit, and
   a signal combiner connected to said reception antenna, said signal detector and said delay circuit, said signal combiner combines said reception signal with the output of said variable phase shifter, said variable attenuator and delay circuit for cancelling the spillover level.

4. A repeater according to claim 1, wherein said amplifier operates in radio frequency.

5. A repeater according to claim 1, wherein a first converting means for converting reception radio frequency to intermediate frequency is provided between said reception antenna and said amplifier, said amplifier operates in said intermediate frequency, and a second converting means for converting amplified intermediate frequency to radio frequency is provided between said amplifier and said transmission antenna.

6. A repeater according to claim 1, wherein said frequency offset means is an infinite phase shifter.

7. A repeater according to claim 2, wherein reception signal has a plurality of channels, said frequency offset means is common to all the channels, said signal detector has a plurality of bandpass filters relating to the channels for measuring offset component for each channel, and the gain control of the repeater is effected for each channel according to measured offset component in each channel.

8. A repeater according to claim 1, wherein the offset frequency is higher than fading frequency of reception signal, but is low enough so that it does not affect to operation of the receiver.

9. A repeater according to claim 8, wherein said offset frequency is lower than 1/10 of channel period.

10. A repeater according to claim 8, wherein said offset frequency is in the range between 50 Hz and 200 Hz.

* * * * *

UNITED STATES PATENT AND TRADEMARK OFFICE
CERTIFICATE OF CORRECTION

PATENT NO. : 4,776,032
DATED : October 4, 1988
INVENTOR(S) : Hitoshi ODATE et al It is certified that error appears in the above-identified patent and that said Letters Patent is hereby corrected as shown below:

On the cover page, Item [30], "May 15, 1985" should read --May 15, 1986--.

Signed and Sealed this

Fourteenth Day of March, 1989

Attest:

DONALD J. QUIGG

*Attesting Officer*  *Commissioner of Patents and Trademarks*